United States Patent [19]
Post et al.

[11] Patent Number: 6,135,327
[45] Date of Patent: Oct. 24, 2000

[54] BATTERY OPERATED GREASE GUN

[75] Inventors: Steven W. Post; William T. Kowalchik, both of Jonesboro, Ark.

[73] Assignee: McNeil (Ohio) Corporation, St. Paul, Minn.

[21] Appl. No.: 09/164,655

[22] Filed: Oct. 1, 1998

[51] Int. Cl.[7] .................................................. G01F 11/36
[52] U.S. Cl. ............................................................ 222/333
[58] Field of Search .................................. 222/258, 261, 222/262, 263, 333; 184/105.2

[56] References Cited

U.S. PATENT DOCUMENTS

| | | |
|---|---|---|
| 3,987,869 | 10/1976 | Bowers . |
| 3,993,250 | 11/1976 | Shure . |
| 4,030,665 | 6/1977 | Koyama . |
| 4,114,781 | 9/1978 | Doyel . |
| 4,160,525 | 7/1979 | Wagner ................... 222/333 |
| 4,162,037 | 7/1979 | Koyama .................. 222/333 |
| 4,171,072 | 10/1979 | Davis, Jr. ................ 222/333 |
| 4,257,540 | 3/1981 | Wegmann et al. . |
| 4,273,269 | 6/1981 | Davis, Jr. ................ 222/333 |
| 4,653,675 | 3/1987 | Ratzky . |
| 4,706,848 | 11/1987 | D'Andrade . |
| 5,150,841 | 9/1992 | Silvenis et al. . |
| 5,188,259 | 2/1993 | Petit . |
| 5,203,476 | 4/1993 | Keller . |
| 5,257,913 | 11/1993 | Schwarzer et al. . |
| 5,271,528 | 12/1993 | Chien . |
| 5,353,971 | 10/1994 | Vaziri . |
| 5,404,967 | 4/1995 | Barry . |
| 5,503,307 | 4/1996 | Wilson et al. . |
| 5,556,009 | 9/1996 | Motzko . |
| 5,590,816 | 1/1997 | Bertram et al. . |
| 5,609,274 | 3/1997 | Shih et al. . |
| 5,685,462 | 11/1997 | Barry . |
| 5,709,317 | 1/1998 | Bertram et al. . |
| 5,716,007 | 2/1998 | Nottingham et al. . |
| 5,732,794 | 3/1998 | Orlitzky . |
| 5,775,539 | 7/1998 | Bates et al. .............. 222/333 |

*Primary Examiner*—Philippe Derakshani
*Attorney, Agent, or Firm*—Howell & Haferkamp, L.C.

[57] ABSTRACT

A battery operated grease gun includes a pump mechanism that employs a speed reducing and torque increasing planetary gearing transmission which rotates a final driver that is a part of the transmission, and a sliding yoke that is reciprocated by the final driver and is coupled to a plunger that dispenses the grease under pressure where the plunger is mounted to the yoke for relative movement therebetween.

27 Claims, 3 Drawing Sheets

BATTERY OPERATED GREASE GUN

BACKGROUND OF THE INVENTION

(1) Field of the Invention

The present invention pertains to a battery operated grease gun and in particular to a pump mechanism of the grease gun that employs a speed reducing and torque increasing transmission that rotates a final driver that is a part of the transmission, and a sliding yoke that is reciprocated by the final driver and is coupled to a plunger that dispenses the grease under pressure where the plunger is mounted to the yoke for relative movement therebetween.

(2) Description of the Related Art

A conventional hand operated grease gun is basically comprised of a housing containing a pump mechanism comprised of a plunger that reciprocates in a tubular pump chamber, a check valve and discharge spout that communicate with the pump chamber, a grease reservoir that communicate with the pump chamber tube and is adapted to have a tubular body containing grease or a grease reservoir attached thereto, and a manually manipulated pump lever or handle that is pivotally connected to the housing and is connected to the pump plunger to reciprocate the plunger in the pump chamber on manual pivoting movement of the lever. In manually operated grease guns of this type, the rate at which the lever is manually pivoted determines the rate at which grease is dispensed through the discharge spout. In addition, the manual force exerted on the lever multiplied by the length of the lever used as leverage determines the force or pressure of the grease dispensed from the gun through the discharge spout.

More recent designs in grease guns have resulted in battery operated grease guns that eliminate the need to manually pivot the grease gun lever. This is accomplished by providing an electric motor that reciprocates the pump plunger to dispense grease under pressure from the battery operated grease gun. Many of the features of the manually operated grease gun are employed in the battery operated grease gun. Examples of battery operated grease guns and similar extruders are disclosed in the U.S. patents of Wegmann et al. U.S. Pat. No. 4,257,540, issued Mar. 24, 1981; Barry U.S. Pat. No. 5,404,967, issued Apr. 11, 1995; Shih et al. U.S. Pat. No. 5,609,274, issued Mar. 11, 1997; and Barry U.S. Pat. No. 5,685,462, issued Nov. 11, 1997.

In many battery operated grease guns the rotation of an electric motor output shaft is transformed into linear reciprocating movement of the grease gun plunger which dispenses grease under pressure from the grease gun. There are many different types of mechanisms and gearing transmissions employed in the prior art that convert the rotating output of the electric motor output shaft to the linear reciprocating movement of the plunger. A drawback observed in the transmission of rotary movement to linear reciprocating movement is that the plunger, in addition to being subjected to forces directed along the line of its linear reciprocation will also be subjected to forces that are not directed along the line of linear reciprocation due to the plunger being driven from the rotating output shaft of the electric motor. With the plunger being confined to reciprocating in a pump chamber that is basically a cylindrical tube, the forces directed off line with the line of plunger reciprocation can have a tendency to cause the plunger to bind or catch in the pump chamber as the plunger reciprocates. This can affect the dispensing performance of the battery operated grease gun and can lead to wear of the plunger and pump chamber wall which could lead to the complete inability of the battery operated grease gun to dispense grease under pressure.

In addition, because it is often necessary that the battery operated grease gun dispense grease under a significant pressure in order for it to perform satisfactorily, a significant force must be exerted on the plunger as it dispenses grease from the grease gun. The significant force is generated by a gearing transmission or similar mechanism that reduces the output speed of rotation of the electric motor and increases its torque. Such power transmission mechanisms often cannot be constructed compactly and many prior art battery operated grease guns have been designed that are awkward and difficult to use due to the size requirements of their power transmissions and the positioning of the power transmission, battery and electric motor on the grease gun.

A battery operated grease gun having a compact power transmission design that also eliminates the potential of the plunger binding or catching in the pump chamber as it reciprocates would overcome the disadvantages experienced in many prior art battery operated grease gun designs.

SUMMARY OF THE INVENTION

The battery operated grease gun of the present invention has a compact housing that encloses an electric motor, a power transmission, a pump plunger reciprocating in a pump chamber communicating with a grease reservoir and a discharge spout, a final driver driven by the power transmission, a yoke driven by the final driver and operatively connected with the reciprocating plunger, and a battery compartment in a handle of the grease gun housing. In the preferred embodiment, the power transmission is a speed reducing planetary gearing transmission that increases the torque output of the electric motor and drives the final driver in rotation. The final driver has a drive pin on one side that engages the yoke and transforms the rotation of the final driver to reciprocating movement of the yoke and plunger.

A series of planet gears are mounted on the opposite side of the final driver from the drive pin. The planet gears engage with an orbit gear and sun gear of the power transmission. This construction of the final driver contributes to the compactness of the grease gun design.

The yoke reciprocates the plunger through a sliding connection between the yoke and a head of the plunger. This connection enables the plunger head to move relative to the yoke along a line of movement that is transverse to the line of reciprocating movement of the plunger. The connection between the yoke and plunger reduces the potential for the plunger to bind or catch in the pump chamber as it is reciprocated by the yoke.

In the assembly of the grease gun, the manual handle containing the battery compartment is positioned on one side of the final driver, the yoke and plunger, and the battery operated motor and power transmission are positioned on the opposite side of the final driver, yoke and plunger. This gives the battery operated grease gun of the present invention a compact design that is easy to use due to the balancing of the component parts of the grease gun on opposite sides of the plunger and pump chamber.

BRIEF DESCRIPTION OF THE DRAWINGS

Further objects and features of the present invention are revealed in the following detailed description of the preferred embodiment of the invention and in the drawing figures wherein.

DETAILED DESCRIPTION OF THE PREFERRED EMBODIMENT

Figure 1:
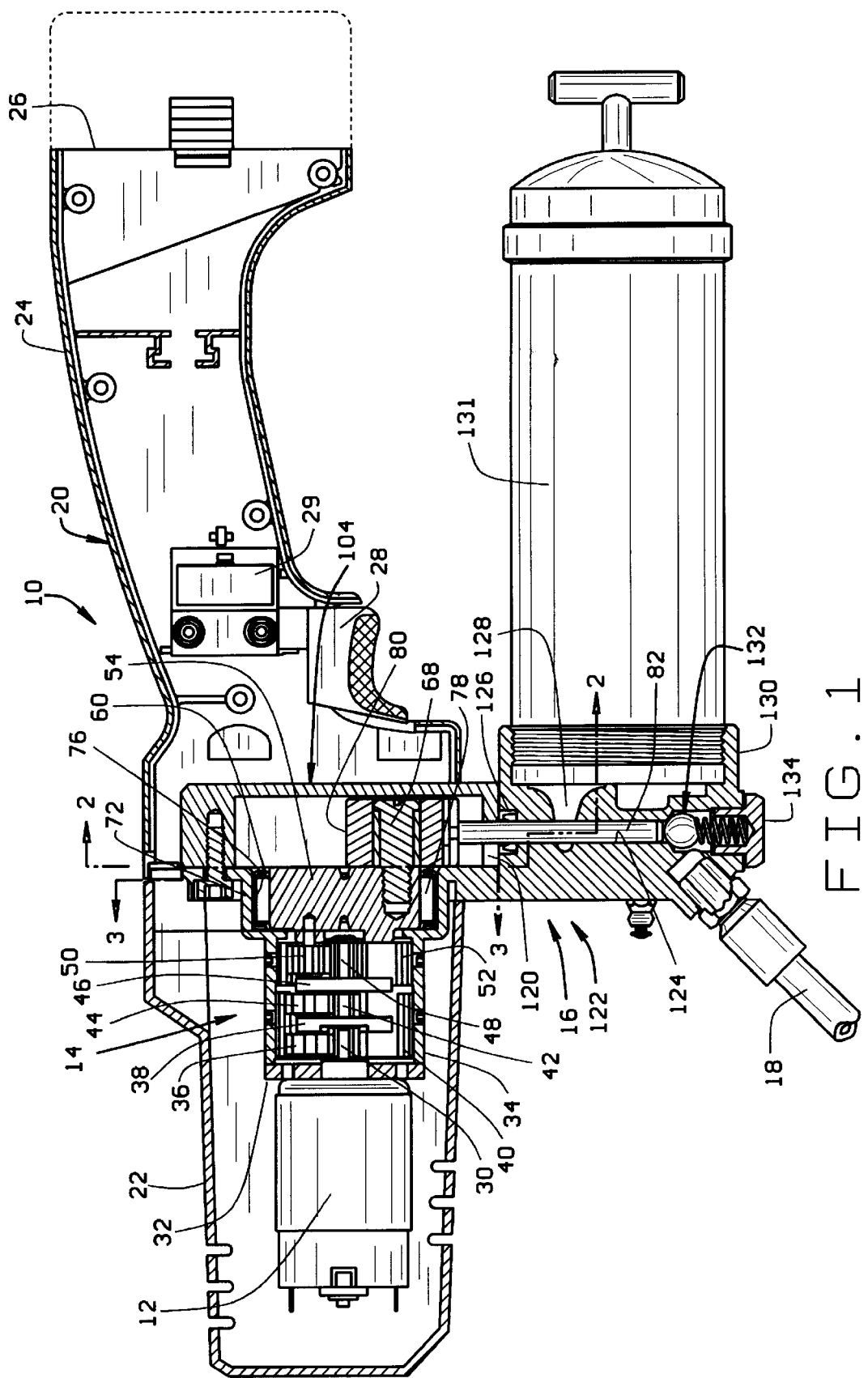
FIG. 1 is a side elevation view, in section, of the battery operated grease gun of the present invention.

The battery operated grease gun 10 of the present invention is shown in FIG. 1. The grease gun 10 basically comprises an electric motor 12 that drives a power transmission 14 that in turn drives a pump mechanism 16 that discharges grease under pressure through a discharge spout 18. These component parts are contained in or mounted on a housing 20.

The housing 20 in the preferred embodiment is constructed of plastic as is typical in many prior art battery operated grease guns. The housing 20 is constructed of several housing parts that are held together by fasteners (not shown), as also is conventional. The housing is constructed with a motor and transmission compartment 22 on one side and a manual handle 24 on an opposite side. The handle 24 is basically hollow and can be dimensioned to accommodate one or more batteries (not shown) in its interior. Alternatively, the bottom edge 26 of the handle can be designed for the attachment of a separate battery compartment represented by dashed lines in FIG. 1. A trigger 28 is mounted on the handle 24 in a position where it can be easily manipulated by the index finger of a hand gripping the handle. The trigger 28 is connected to an electric switch 29 that is selectively operated by manual manipulation of the trigger to provide electric power from the batteries to the electric motor 12 to operate the motor. The selective operation of the electric motor 12 in this manner is well known in the prior art. The positioning of the handle 24 containing the batteries or having a battery compartment attached thereto and the positioning of the electric motor 12 and power transmission 14 on opposite sides of the pump mechanism 16 provides a distribution of the weight of the grease gun that enables the grease gun to be more easily manually manipulated while gripping the handle 24.

The electric motor 12 is mounted in the motor and transmission compartment 22 of the housing 20 adjacent the power transmission 14 mounted in the compartment. The motor 12 has an output shaft with a spur gear 30 mounted thereon. The output shaft and spur gear 30 extend through an end wall 32 of a gear casing 34 of the power transmission 14. In the preferred embodiment of the invention, the power transmission 14 contained in the gear casing 34 is a three stage planetary gearing reduction transmission. It is not necessary that the transmission have three stages of planetary gearing. Any number of planetary gear stages could be made to work depending upon the motor construction.

The output spur gear 30 of the electric motor 12 also functions as a sun gear of a first planetary gear set of the power transmission 14. This spur gear 30 drives three planet gears 36 (only one of which is seen in FIG. 1) of a first carrier 38 of the first planetary gear set. The planet gears 36 also mesh with a first orbit gear 40 that is fixed to the gear casing 34 of the power transmission. Rotation of the output spur gear 30 of the electric motor causes the first carrier 38 to rotate at a reduced speed while increasing the torque of the motor output.

A second sun gear 42 is fixed to the first carrier 38. This second sun gear 42 drives three planet gears (only one of which is shown in FIG. 1) of a second planetary gear set of the power transmission 14. The second series of planet gears 44 are mounted on a second carrier 46 and also mesh with the fixed orbit gear 40 of the first planetary gear set. This second planetary gear set further reduces the speed of rotation of the electric motor output and further increases its torque.

A third sun gear 48 is fixed to the second planet gear carrier 46. This third sun gear 48 meshes with three planet gears 50 of a third planetary gear set of the power transmission 14. The third set of planet gears 50 mesh with a second orbit gear 52 that is fixed to the gear casing 34 of the power transmission 14. The third set of planet gears 50 are mounted for rotation on a final driver 54. This third planetary gearing arrangement further reduces the output speed of the electric motor 12 while increasing its torque. The planetary gearing arrangements of the power transmission 14 transform the output of the electric motor 12 reducing its speed while increasing its torque as it is transmitted to the final driver 54 causing rotation of the final driver.

Figure 4:
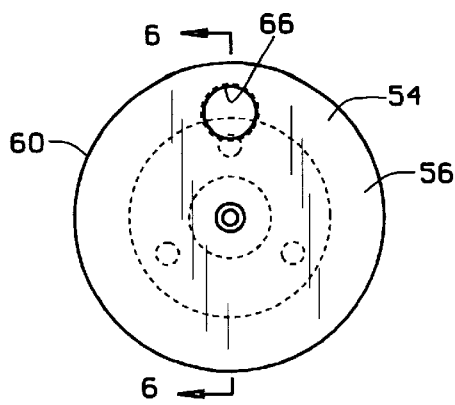
FIG. 4 is a view of the drive surface of the final driver removed from the grease gun.
Figure 5:
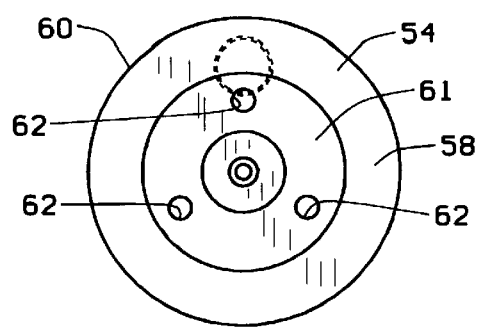
FIG. 5 is a view of the driven surface of the final driver removed from the grease gun.
Figure 6:
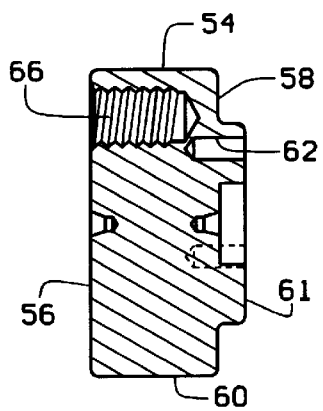
FIG. 6 is a cross-section of the final driver taken along the ling 6—6 of FIG. 4.
Figure 7:
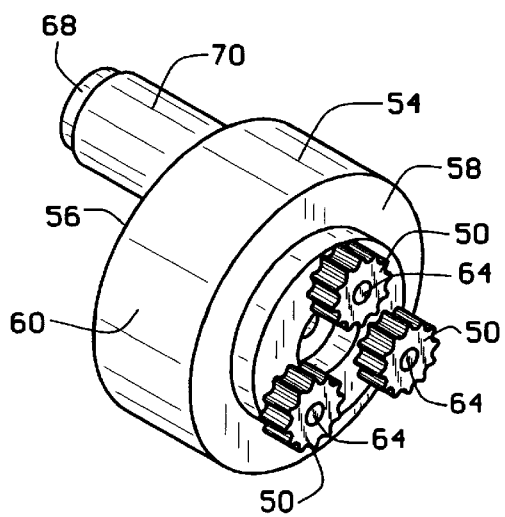
FIG. 7 is a perspective view of the final driver showing its driven surface with planet gears attached and showing the drive pin projecting from its drive surface.

The construction of the final driver 54 is shown in FIGS. 4–7. FIGS. 4–6 show the final driver with its component parts removed and FIG. 7 shows the final driver including its component parts. The final driver 54 has a circular drive surface 56 shown in FIG. 4 and a circular driven surface 58 shown in FIG. 5. The final driver has a cylindrical peripheral surface 60 that spaces the drive 56 and driven 58 surfaces. The driven surface 56 has a raised annular shoulder 61 centered on the surface. Three shaft holes 62 extend into the annular shoulder 61 and are spacially arranged around the center of the driven surface. Three shafts 64 are inserted into the shaft holes 62 and the planet gears 50 of the third gear set are mounted on the shafts for rotation as shown in FIG. 7. A driven pin hole 66 with internal screw threading extends into the drive surface 56 of the final driver. A drive pin 68 with a cylindrical bushing 70 mounted for rotation thereon is screw threaded into the internal hole 66 in the final drive drive surface 56. The drive pin 68 and its bushing 70 are shown in FIGS. 1 and 7.

Figure 3:
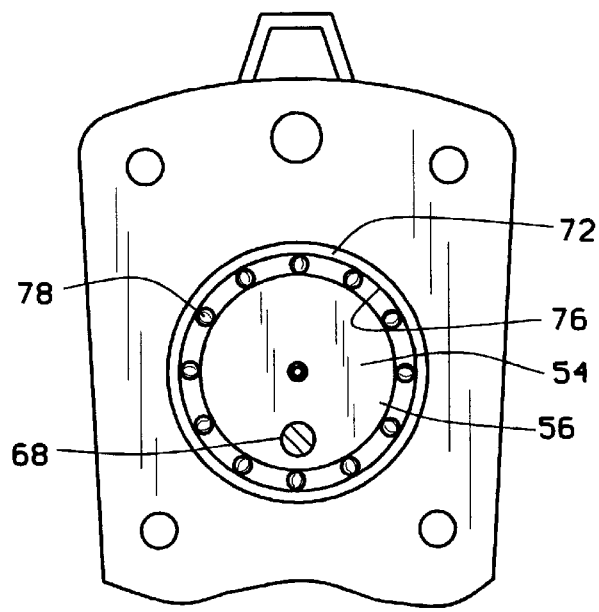
FIG. 3 is a partial rear elevation view of the final driver taken along the line 3—3 of FIG. 1.

The gear casing 34 of the power transmission 14 has an annular collar 72 and the final driver 54 is mounted for rotation in the annular collar. As shown in FIGS. 1 and 3, the annular collar 72 has a cylindrical interior surface 76 that is radially spaced from the cylindrical peripheral surface 60 of the final driver. Positioned between the cylindrical peripheral surface 60 of the final driver and the cylindrical interior surface 76 of the annular collar is a roller bearing assembly 78 that mounts the final driver 54 for rotation in the annular collar 72. On rotation of the output spur gear 30 of the electric motor 12, the rotation is transmitted through the power transmission 14 to the final driver 54 and rotates the final driver in the annular collar 72 at a reduced speed of rotation from that of the motor output spur gear 30 and at an increased torque. The rotation of the final driver 54 is transmitted by the drive pin 68 and drive pin bushing 70 to a yoke 80 and plunger 82 of the pump mechanism 16.

Although the final driver 54 functions as a carrier of the power transmission 14 in the same manner as the first 38 and second 46 planet gear carriers of the transmission, its axial width is substantially enlarged compared to that of the carriers. This can be seen in FIGS. 1 and 7. This increased axial width of the final driver 54 stabilizes it in the annular collar 72 and resists any tilting or skewing of the final driver 54 relative to its center axis due to forces exerted by the yoke 80 against the drive pin 68 during rotation of the final driver. In addition, the three planet gears 50 mounted on the final driver 54 also handle thrust forces from the drive mechanism. The three planet gears 50 meshing with the second orbit gear 52 hold the final driver 54 in its orientation with its center axis of rotation located co-axially with the axes of rotation of the transmission sun gears 30, 42, 48 and the motor output shaft, and resist any tendency of the final driver 54 to be titled or skewed from the overhung load of the forces exerted on the drive pin 68 by the yoke 80. This enables the final driver 54 to exert a substantial force on the yoke 80 which enables the yoke 80 to drive the plunger 82 to discharge grease from the grease gun at a substantial pressure as will be explained. By constructing the final driver 54 as part of the power transmission 14 on the driven surface 58 of the final driver and as part of the pump mechanism 16 on the drive surface 56 of the driver, a compact construction of the grease gun is achieved.

Figure 9:
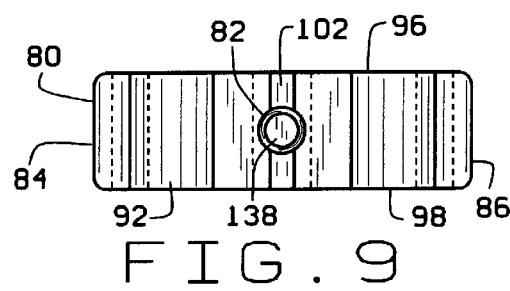
FIG. 9 is a bottom view of the yoke and plunger shown in FIG. 8.

The yoke 80 has a generally square configuration with opposite pairs of side sliding surfaces 84, 86 spaced from each other by depressed surfaces 88, 90, respectively, a bottom surface 92 and a top surface 94. Opposite face surfaces 96, 98 of the yoke are planar and parallel to each other as shown in FIG. 9. An oblong cam slot 100 passes through the yoke between the opposite face surfaces 96, 98. The cam slot 100 is dimensioned to receive the drive pin 68 and its bushing 70 therein allowing sufficient room to enable the drive pin and bushing to slide through the cam slot freely from end to end. A transverse T-shaped slot 102 passes through the yoke bottom surface 92 between its opposite face surfaces 96, 98. This transverse slot 102 functions as a plunger head slot as will be explained.

Figure 2:
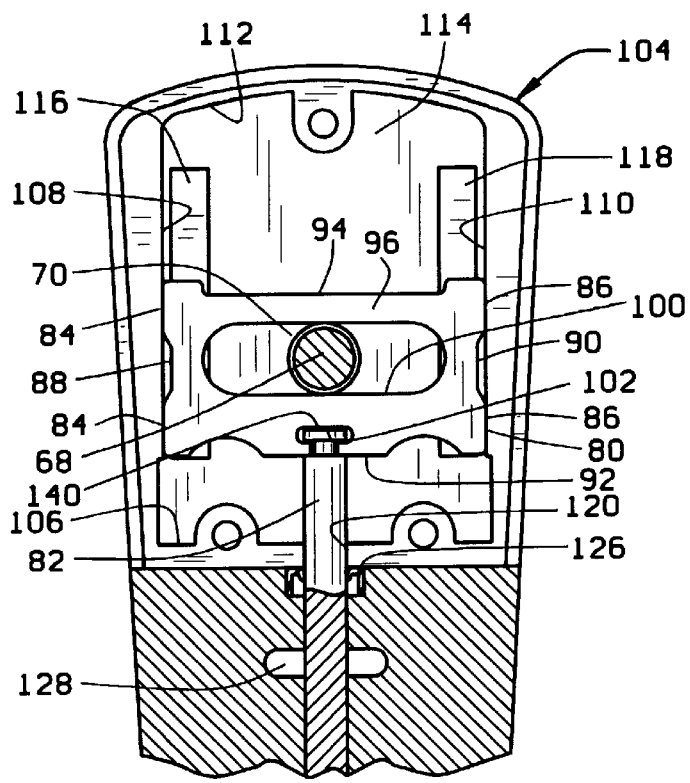
FIG. 2 is a partial front elevation view of the yoke and plunger of the grease gun taken along the line 2—2 of FIG. 1.

The yoke 80 is mounted in a slide box 104 that is attached to the annular collar 72 of the gear casing and is partially contained in the grease gun housing 20. The slide box 104 is shown in FIGS. 1 and 2 and is preferably constructed of die cast aluminum but may be constructed of other similar light weight materials. The slide box 104 has a generally square exterior configuration and contains a generally square hollow interior volume defined by a bottom wall 106, opposite side walls 108, 110, a top wall 112 and a back wall 114. As seen in FIG. 2, the opposite side walls 108, 110 are spaced from each other a distance that allows the yoke 80 to be positioned between the side walls with the side sliding surfaces 84, 86 of the yoke in sliding engagement with the respective opposite side walls 108, 110 of the slide box. This relationship between the engaging surfaces enables the yoke 80 to reciprocate through the slide box interior while substantially maintaining its orientation relative to the slide box interior shown in FIG. 2. A pair of sliding rails 116, 118 are provided on the back wall 114 of the slide box and the yoke 80 slides across these rails as it reciprocates through the interior of the slide box. The dimensioning of the slide box interior walls 108, 110 and rails 116, 118 permits limited movement of the yoke 80 from right to left and forward and backward in the slide box as it is reciprocated by the final driver 54. This limited amount of movement of the yoke 80 relative to the slide box compensates for any inaccuracies in the assembly of the slide box to the annular collar 72 of the gear casing. A notch 120 is formed in the bottom wall 116 of the slide box to accommodate the plunger 82 as shown in FIGS. 1 and 2.

The pump mechanism 16 includes a pump housing 122 that, in the embodiment shown in the drawings is an integral extension of the annular collar 72 of the gear casing. The pump housing 122 contains a cylindrical pump chamber 124 that is dimensioned to receive the plunger 82 in sliding engagement therein. As seen in FIGS. 1 and 2, the pump chamber 124 aligns with the notch 120 in the slide box bottom wall 106. This enables the plunger 82 positioned in the pump chamber 124 to extend upwardly through the notch 120 to its connection with the yoke 80 shown in FIGS. 1 and 2. A resilient seal 126 is positioned in an annular recess in the pump housing 122 and surrounds the plunger 82. The seal 126 seals the pump chamber 124 from the slide box notch 120. The pump chamber 124 also communicates with a lubricant supply passage 128. The lubricant supply passage 128 communicates with the interior of a cylindrical skirt 130 of the pump housing. The cylindrical skirt 130 has internal screw threading that is adapted to receive external screw threading on a cylindrical lubricant reservoir 131 of the type that is typically employed with grease guns. The lubricant supply reservoir 131 contains either a supply of lubricant drawn therein or a cartridge of lubricant and has a spring biased plunger that exerts a pressure on the lubricant contained in the reservoir. The pressure exerted by the plunger provides a continuous supply of lubricant to the supply passage 128. The operation of the cylindrical lubricant reservoir is typical of prior art grease guns that are both manually and battery operated and therefore the reservoir is not shown in the drawing figures.

A ball check valve assembly 132 is positioned in the bottom of the pump housing 122 communicating with the pump chamber 124 and is held in place by a screw threaded plug 134. The chamber of the pump housing containing the ball valve 132 also communicates with the discharge spout 18 of the grease gun. The positioning of the ball check valve 132 and the discharge spout 18 shown in FIG. 1 is common to many prior art grease guns. On reciprocation of the plunger 82 in the pump chamber 124, lubricant supplied to the pump chamber through the supply passage 128 is put under pressure. With increased pressure of the lubricant, the ball valve 132 unseats and enables the lubricant under pressure to pass through the ball valve chamber to the discharge spout 18. This operation is typical in many prior art grease guns.

Figure 8:
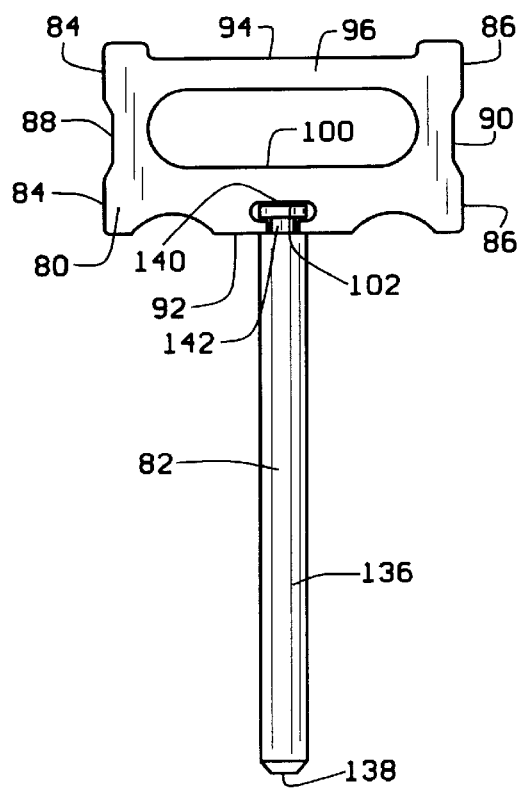
FIG. 8 is a side elevation view of the yoke and plunger removed from the grease gun.

The plunger 82 of the grease gun is shown removed from the grease gun and connected to the yoke 80 in FIG. 8. The plunger 82 has a cylindrical shank 136 that is sized to fit into the cylindrical pump chamber 124 so that the exterior surface of the shank 136 engages in sliding engagement with the interior surface of the pump chamber 124. The plunger has a bottom piston surface 138 and has a circular head 140 at its opposite end. The circular head 140 is connected to the shank portion 136 of the plunger by a necked down portion 142 of the plunger. As seen in FIGS. 1, 2 and 8, the circular head 140 of the plunger is dimensioned to be received in the T-slot 102 in the bottom surface of the yoke 80. The dimensions of the plunger head 140 and its necked down portion 142 enable the plunger head and necked down portion to slide freely through the T-slot 102 of the yoke. The T-slot 102 is dimensioned slightly larger than the plunger head 140 and plunger necked down portion 142 so that there is a gap or small spacing between the plunger head 140 and necked down portion 142 and the interior surface of the slot 102. This enables the plunger 82 to move slightly relative to the yoke 80 from left to right, front to back and upward and downward as viewed in FIG. 5. This relative movement between the yoke 80 and plunger 82 is necessary because the yoke 80 is dimensioned to enable its slight movement relative to the interior of the slide box as described earlier. With the yoke 80 free to move slightly in the slide box as it is reciprocated, its connection to the plunger 82 provided by the slot 102 must enable the plunger to move slightly relative to the yoke as it is reciprocated to avoid binding of the plunger and the yoke. In addition, dimensioning the T-slot 102 slightly larger than the plunger head 140 and necked down portion 142 also makes for ease of assembling the plunger head into the yoke slot. With the plunger 82 received in the pump chamber 24 its movement relative to the pump chamber is basically an axial reciprocation through the chamber. The sliding connection of the plunger head 140 with the yoke slot 102 primarily enables the yoke 80 to move in a direction transverse to the path of axial reciprocation of the plunger 82 in the pump chamber 124.

In operation of the battery operated grease gun of the present invention, a cylindrical reservoir filled with lubricant is first connected to the cylindrical skirt 130 of the pump housing 122. As explained earlier, the cylindrical reservoir supplies lubricant to the lubricant supply passage 128 of the pump housing. The user of the grease gun then grips the handle 24 and manually manipulates the trigger switch 28 to activate the electric motor 12. The rotation of the motor output spur gear 30 is transmitted through the power transmission 14 to cause the final driver 54 to rotate within the roller bearing assembly 78 and the annular collar 72 of the gear casing. The rotation of the final driver 54 is transmitted to the yoke 80 by the drive pin 68 and its bushing 70 which extend into the cam slot 100 of the yoke. As the final driver 54 rotates, it causes the yoke 80 to slide in reciprocating movement inside the slide box 104.

The sliding reciprocating movement of the yoke is transmitted to the plunger 82 causing it to reciprocate through the pump chamber 124. The reciprocation of the plunger 82 causes its bottom piston surface 138 to be retracted beyond the lubricant supply passage 124 enabling lubricant to enter into the pump chamber 124. On the return stroke of the plunger 82, the lubricant is pushed through the pump chamber 124 and is put under pressure. The pressure of the lubricant increases until it unseats the ball check valve 132 and is then discharged through the spout 18.

With the final driver 54 being mounted in the annular collar 72 by the roller bearing assembly 78, it is possible that the rotation of the final driver by the power transmission 14 could result in some increment of axial movement of the final driver along its axis of rotation. If any such movement does occur, it would be transferred to the yoke 80 by the sliding engagement of the final driver drive surface 56 with the yoke face surface 96. This would produce limited movement of the yoke 80 in the slide box 104 in a direction that is transverse to the direction of reciprocation of the plunger 82 in the pump chamber 124. However, because of the sliding connection of the plunger head 140 in the yoke slot 102, any movement of the yoke 80 transverse to the direction of plunger reciprocation would not be transferred to the plunger. This prevents any possible binding or catching of the plunger 82 in the pump chamber 124 as it is reciprocated by the yoke 80, thus, eliminating a drawback found in some prior art grease guns.

In addition, because the final driver 54 is employed as part of the power transmission 14 in that it functions as a carrier for the third planet gears 50, and also functions as a portion of the pump mechanism in that it drives the yoke 80, a compact construction of the battery operated grease gun is achieved.

While the present invention has been described by reference to a specific embodiment, it should be understood that modifications and variations of the invention may be constructed without departing from the scope of the invention defined in the following claims.

What is claimed:

1. A pump mechanism for a liquid dispenser, the pump mechanism comprising:

a housing;

a yoke mounted in the housing for reciprocating movement of the yoke in the housing, the yoke has an exterior surface and a slot in the exterior surface; and a plunger mounted in the housing for reciprocating movement of the plunger in the housing, the plunger has a head retained in the slot for sliding movement of the plunger head in the slot, whereby the plunger is connected to the yoke for movement of the plunger relative to the yoke.

2. The pump mechanism of claim 1, wherein:

the yoke and the plunger are mounted in the housing for reciprocating movement relative to the housing along a first line of movement, and the plunger is connected to the yoke for movement of the plunger relative to the yoke that is not along the first line of movement.

3. The pump mechanism of claim 1, wherein:

the slot extends along a line that is transverse to the first line of movement of the yoke.

4. The pump mechanism of claim 1, wherein:

a motor is mounted in the housing and a final driver is mounted in the housing for rotation of the final driver by the motor, and the final driver is operatively connected to the yoke for reciprocation of the yoke in response to rotation of the final driver.

5. The pump mechanism of claim 4, wherein:

the final driver has a cylindrical peripheral surface and is mounted in an annular shell of the housing for rotation of the final driver relative to the annular shell.

6. The pump mechanism of claim 5, wherein:

a plurality of roller bearings surround the peripheral surface of the final driver in the annular shell.

7. The pump mechanism of claim 4, wherein:

the final driver has opposite drive and driven surfaces and the peripheral surface extends between the drive and driven surfaces, a drive pin extends from the drive surface and engages with the yoke and a gear tooth surface extends from the driven surface and is driven by the motor.

8. The pump mechanism of claim 7, wherein:

the gear tooth surface is on a gear that is mounted for rotation on the driven surface of the final driver.

9. The pump mechanism of claim 8, wherein:

an orbit gear is mounted stationary in the housing, the gear mounted on the final driver meshes with the orbit gear, and the motor drives the gear on the final driver causing it to rotate against the orbit gear and rotate the final driver.

10. The pump mechanism of claim 5, wherein:

the housing has a manual handle positioned on one side of the final driver and yoke, and the motor is positioned in the housing on an opposite side of the final driver and the yoke from the handle.

11. A pump mechanism for a liquid dispenser, the pump mechanism comprising:

a housing having an interior annular collar;

a plunger mounted in the housing for reciprocating movement of the plunger in the housing;

a final driver having a cylindrical exterior surface, mounted in the annular collar for rotation of the final driver in the annular collar, the cylindrical outer surface of the final driver being spaced from the interior annular collar by a bearing assembly, the final driver being operatively connected to the plunger to cause the plunger to reciprocate in the housing in response to rotation of the final driver; and, a motor in the housing operatively connected to the final driver to rotate the final driver.

12. The pump mechanism of claim 11, wherein:

the annular collar has a cylindrical interior surface and the bearing assembly comprises a plurality of bearings positioned in the annular collar between the peripheral surface of the final driver and the interior surface of the annular collar.

13. The pump mechanism of claim 11, wherein:

the final driver has opposite drive and driven surfaces and the peripheral surface extends between the drive and the driven surfaces, a drive pin extends from the drive surface and is operatively connected to the plunger to reciprocate the plunger in response to rotation of the final driver and a gear tooth surface extends from the driven surface and is driven by the motor.

14. The pump mechanism of claim 13, wherein:

a yoke is mounted in the housing for reciprocating movement of the yoke in the housing, the yoke has a cam slot therein and the drive pin of the final driver engages in the cam slot to cause the yoke to reciprocate in the housing in response to rotation of the final driver, and the yoke is connected to the plunger to cause the plunger to reciprocate in the housing in response to reciprocation of the yoke in the housing.

15. The pump mechanism of claim 13, wherein:

the gear tooth surface is on a gear that is mounted for rotation on the driven surface of the final driver.

16. The pump mechanism of claim 15, wherein:

an orbit gear is mounted stationary in the housing, the gear mounted on the final driver meshes with the orbit gear, and the motor drives the gear on the final driver causing it to rotate against the orbit gear and rotate the final driver.

17. The pump mechanism of claim 16, wherein:

the gear mounted on the final driver is one of a plurality of planet gears mounted for rotation on the driven surface of the final driver and each of the plant gears mesh with the orbit gear and is driven by the motor.

18. The pump mechanism of claim 14, wherein:

the yoke has an exterior surface and a slot in the exterior surface; and the plunger has a head retained in the slot for sliding movement of the plunger head in the slot on movement of the plunger relative to the yoke.

19. A pump mechanism for a liquid dispenser, the pump mechanism comprising:

a housing;

a plunger mounted in the housing for reciprocating movement of the plunger in the housing;

a final driver mounted in the housing for rotation of the final driver relative to the housing; the final driver having opposite drive and driven surfaces, a drive pin extends from the drive surface and is operatively connected to the plunger to reciprocate the plunger in response to rotation of the final driver and a gear tooth surface extends from the driven surface; and, a motor is mounted in the housing and drives the gear tooth surface to rotate the final driver.

20. The pump mechanism of claim 19, wherein:

a yoke is mounted in the housing for reciprocating movement of the yoke in the housing, the yoke has a cam slot therein and the drive pin of the final driver engages in the cam slot to cause the yoke to reciprocate in the housing in response to rotation of the final driver, and the yoke is connected to the plunger to cause the plunger to reciprocate in the housing in response to reciprocation of the yoke in the housing.

21. The pump mechanism of claim 20, wherein:

the yoke has an exterior surface and a slot in the exterior surface; and the plunger has a head retained in the slot for sliding movement of the plunger head in the slot on movement of the plunger relative to the yoke.

22. The pump mechanism of claim 19, wherein:

the housing has an interior annular collar having a cylindrical interior surface;

the final driver has a cylindrical peripheral surface and is positioned in the cylindrical interior surface of the annular collar; and a plurality of bearings are positioned in the annular collar between the interior surface of the annular collar and the peripheral surface of the final driver and support the final driver for rotation in the annular collar.

23. The pump mechanism of claim 22, wherein:

the gear tooth surface is on a gear that is mounted for rotation on the driven surface of the final driver.

24. The pump mechanism of claim 23, wherein:

an orbit gear is mounted stationary in the housing, the gear mounted on the final driver meshes with the orbit gear, and the motor drives the gear on the final driver causing it to rotate against the orbit gear and rotate the final driver.

25. The pump mechanism of claim 19, wherein:

an orbit gear is mounted stationary in the housing;

the gear tooth surface that extends from the driven surface is on one of a plurality of plant gears mounted for rotation on the driven surface of the final driver, and each of the plant gears mesh with the orbit gear and is driven by the motor.

26. The pump mechanism of claim 25, wherein:

the plurality of planet gears are arranged around a sun gear that is driven by the motor and at least some of the planet gears mesh with the sun gear.

27. The pump mechanism of claim 26, wherein:

the sun gear is driven by the motor through a gear transmission.

* * * * *